(12) United States Patent
Bartolucci et al.

(10) Patent No.: US 12,335,363 B2
(45) Date of Patent: *Jun. 17, 2025

(54) COMPUTER-IMPLEMENTED DECISION MAKING SYSTEM AND METHOD

(71) Applicant: nChain Licensing AG, Zug (CH)

(72) Inventors: Silvia Bartolucci, London (GB); Pauline Bernat, London (GB); Daniel Joseph, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,232

(22) Filed: Feb. 15, 2024

(65) Prior Publication Data

US 2024/0313943 A1    Sep. 19, 2024

Related U.S. Application Data

(63) Continuation of application No. 16/962,813, filed as application No. PCT/IB2019/050179 on Jan. 10, 2019, now Pat. No. 11,943,331.

(30) Foreign Application Priority Data

Jan. 18, 2018   (GB) ...................................... 1800818

(51) Int. Cl.
    *H04L 9/00*      (2022.01)
    *G06Q 20/22*     (2012.01)
    (Continued)

(52) U.S. Cl.
    CPC ........... *H04L 9/008* (2013.01); *G06Q 20/223* (2013.01); *G06Q 20/3825* (2013.01);
    (Continued)

(58) Field of Classification Search
    CPC ............. G06Q 20/3829; G06Q 20/223; G06Q 20/3825; G06Q 20/38215; G06Q 20/389;
    (Continued)

(56) References Cited

U.S. PATENT DOCUMENTS

| 5,495,532 | A  | 2/1996 | Kilian et al. |
| 10,762,506 | B1 | 9/2020 | Cash et al. |

(Continued)

FOREIGN PATENT DOCUMENTS

| CN | 105681310 A | 6/2016 |
| CN | 105827399 A | 8/2016 |

(Continued)

OTHER PUBLICATIONS

SungHyun Na, "Web-based Nominal Group Technique Decision Making Tool Using Blockchain", Published in: 2018 International Conference on Platform Technology and Service (PlatCon), Date of Conference: Jan. 29-31, 2018, 5 pages (Year: 2018).*

(Continued)

*Primary Examiner* — Shahriar Zarrineh
(74) *Attorney, Agent, or Firm* — Tarolli, Sundheim, Covell & Tummino LLP

(57) ABSTRACT

A method for decision-making on a blockchain includes receiving first public keys from participants, where the first public keys are related to first private keys. The first public keys are combined to generate second public keys, where the second public keys are decisions based on selections among the participants. Third public keys, which correspond to the second public keys, are communicated to the participants. A voting blockchain transaction is generated, where an input script is executed by using a digital signature that corresponds to each participant's first private key, which corresponds to a participant's selection. Output of the voting transaction is a script that represents a decision based on the (Continued)

participants' selections. A payment blockchain transaction is generated, where execution of an output of the payment transaction requires a digital signature that corresponds to a third public key, which corresponds to the decision of the voting transaction.

20 Claims, 11 Drawing Sheets

(51) Int. Cl.
   *G06Q 20/38* (2012.01)
   *H04L 9/32* (2006.01)
(52) U.S. Cl.
   CPC ....... *G06Q 20/3829* (2013.01); *H04L 9/3252* (2013.01); *H04L 2209/463* (2013.01)
(58) Field of Classification Search
   CPC ....... G06Q 20/02; H04L 9/008; H04L 9/3252; H04L 2209/463; G06N 5/01
   See application file for complete search history.

(56) References Cited

U.S. PATENT DOCUMENTS

| | | | |
|---|---|---|---|
| 2008/0110985 | A1 | 5/2008 | Cohen et al. |
| 2017/0109955 | A1 | 4/2017 | Ernest et al. |
| 2017/0337534 | A1* | 11/2017 | Goeringer .............. G06Q 20/06 |
| 2017/0344987 | A1* | 11/2017 | Davis ....................... H04L 9/321 |
| 2017/0352219 | A1 | 12/2017 | Spanos et al. |
| 2019/0036678 | A1 | 1/2019 | Ahmed |
| 2019/0139047 | A1* | 5/2019 | Rønnow ................. H04L 63/10 |
| 2019/0158272 | A1 | 5/2019 | Chopra et al. |
| 2019/0371106 | A1 | 12/2019 | Kaye |
| 2021/0304544 | A1 | 9/2021 | Oh et al. |
| 2022/0189232 | A1 | 6/2022 | Zbeda et al. |

FOREIGN PATENT DOCUMENTS

| | | | | |
|---|---|---|---|---|
| CN | 106411503 | A | | 2/2017 |
| CN | 106553661 | A | | 4/2017 |
| CN | 107145768 | A | * | 9/2017 ............. G06F 21/10 |
| CN | 107833135 | A | | 3/2018 |
| JP | H11296607 | A | | 10/1999 |
| JP | 2006279716 | A | | 10/2006 |
| JP | 4199747 | B2 | | 12/2008 |
| KR | 101833323 | B1 | | 2/2018 |
| KR | 101908677 | B1 | | 10/2018 |
| RU | 2652443 | C1 | | 4/2018 |
| WO | 2016207542 | A1 | | 12/2016 |
| WO | WO-2017145005 | A1 | * | 8/2017 ......... G06F 12/1408 |
| WO | WO-2017148245 | A1 | * | 9/2017 ............. G06F 21/10 |
| WO | 2018015177 | A1 | | 1/2018 |
| WO | 2020136319 | A1 | | 7/2020 |

OTHER PUBLICATIONS

Wenbin Zhang, "A Privacy-Preserving Voting Protocol on Blockchain", Published in: 2018 IEEE 11th International Conference on Cloud Computing (CLOUD), Date of Conference: Jul. 2-7, 2018, 8pages (Year: 2018).*
R. Hanifatunnisa and B. Rahardjo, "Blockchain Based e-voting Recording System Design," 2017 11th International Conference on Telecommunication Systems Services and Applications (TSSA), Lombok, Indonesia, 2017, 6 pages.
Anonymous, "Development Update #60," Skycoin Blog, https://www.skycoin.net/blog/development-updates/development-update-60/, 3 pages.
Antonopoulos, "Mastering Bitcoin—Unlocking Digital Cryptocurrencies," O'Reilly Media, Inc., Dec. 20, 2014, 282 pages.
Bin Yu et al., "Platform-independent Secure Blockchain-Based Voting System", Monash University Australia, CSIRO Australila, The Hong Kong Polytechnic University, Part of the Lecture Notes in Computer Science Book Series (LNSC, vol. 11060) First Online: Aug. 15, 2018, 26 pages.
Blurden et al., "The Growth of Cryptography MIT Lecture," Bitcoin Forum, https://bitcointalk.org/index.php?topic=3580.0, Feb. 18, 2011, 2 pages.
Cosmas Krisna Adiputra, "Propsal of Blockchain-Based Electronic Voting System", Published in 2018 Second World Conference on Smart Trends in Systems, Security and Stustainability (WorldS4) Date of Conference: Oct. 30-31, 2018, 6 pages.
Hsiao et al., "Decentralized E-Voting Systems Based on the Blockchain Technology," Advances in Computer Science and Ubiquitous Computing, Jan. 2018, 5 pages.
International Search Report and Written Opinion mailed Mar. 26, 2019, Patent Application No. PCT/IB2019/050179, 10 pages.
Kiayias et al., "Tree-Homomorphic Encryption and Scalable Hierarchical Secret-Ballot Elections," International Conference on Financial Cryptography and Data Security, 2010, 15 pages.
Moran et al., "Receipt-Free Universally-Verifiable Voting With Everlasting Privacy," Annual International Cryptology Conference, 2006, 20 pages.
Nakamoto, "Bitcoin: A Peer-to-Peer Electronic Cash System," Bitcoin, Oct. 31, 2008, https://bitcoin.org/bitcoin.pdf, 9 pages.
Riemann, "Towards Trustworthy Online Voting: Distributed Aggregation of Confidential Data," Cryptography and Security [cs.CR]. Ecole normale supérieure de Lyon, 2017, 166 pages.
Satoshi et al., "Connection Limits," Bitcoin Forum, Aug. 9, 2010, https://bitcointalk.org/index.php?topic=741.0;prev_next=prev, 2 pages.
Shaheen et al., "Temper Proof Data Distribution for Universal Verifiability and Accuracy in Electoral Process Using Blockchain," 13th International Conference on Emerging Technologies (ICET), 2017, 6 pages.
UK Commercial Search Report mailed May 25, 2018, Patent Application No. GB1800818.5, 6 pages.
UK IPO Search Report mailed Jun. 29, 2018, Patent Application No. GB1800818.5, 7 pages.
Zhang et al: "A Privacy-Preserving Voting Protocol on Blockchain", IEEE Computer Society, (2018), 9 pages.

* cited by examiner

| if     | (condo_1) |        |          |          |          |           |           |           |
|--------|-----------|--------|----------|----------|----------|-----------|-----------|-----------|
|        | [Do_1]    |        |          |          |          |           |           |           |
| else   |           |        |          |          |          |           |           |           |
|        | if        | (condo_2) |       |          |          |           |           |           |
|        |           | [Do_2] |          |          |          |           |           |           |
|        | else      |        |          |          |          |           |           |           |
|        |           | if     | (condo_3) |         |          |           |           |           |
|        |           |        | [Do_3]   |          |          |           |           |           |
|        |           | else   |          |          |          |           |           |           |
|        |           |        | if       | (condo_4) |        |           |           |           |
|        |           |        |          | [Do_4]   |          |           |           |           |
|        |           |        | else     |          |          |           |           |           |
|        |           |        |          | if       | (condo_5) |          |           |           |
|        |           |        |          |          | [Do_5]   |           |           |           |
|        |           |        |          | else     |          |           |           |           |
|        |           |        |          |          | if       | (condo_6) |          |           |
|        |           |        |          |          |          | [Do_6]    |           |           |
|        |           |        |          |          | else     |           |           |           |
|        |           |        |          |          |          | if        | (condo_7) |           |
|        |           |        |          |          |          |           | [Do_7]    |           |
|        |           |        |          |          |          | else      |           |           |
|        |           |        |          |          |          |           | if        | (condo_8) |
|        |           |        |          |          |          |           |           | [Do_8]    |
|        |           |        |          |          |          |           | end_if    |           |
|        |           |        |          |          |          | end_if    |           |           |
|        |           |        |          |          | end_if   |           |           |           |
|        |           |        |          | end_if   |          |           |           |           |
|        |           |        | end_if   |          |          |           |           |           |
|        |           | end_if |          |          |          |           |           |           |
|        | end_if    |        |          |          |          |           |           |           |
| end_if |           |        |          |          |          |           |           |           |

FIG. 9

COMPUTER-IMPLEMENTED DECISION MAKING SYSTEM AND METHOD

CROSS REFERENCE TO RELATED APPLICATIONS

This application is a continuation of U.S. patent application Ser. No. 16/962,813, filed Jul. 16, 2020, entitled "COMPUTER-IMPLEMENTED DECISION MAKING SYSTEM AND METHOD," which is a 371 National Stage of International Patent Application No. PCT/IB2019/050179, filed Jan. 10, 2019, which claims priority to United Kingdom Patent Application No. 1800818.5, filed Jan. 18, 2018, the disclosures of which are incorporated herein by reference in their entirety.

BACKGROUND

This invention relates generally to a system and method for automated decision making, and more particularly to automated decision making via a blockchain. The invention is particularly suited, but not limited to, use in methods of voting via a blockchain.

SUMMARY

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

In the case of automated decision making, in many situations, not only are decisions dependent on a set of factors, but decisions can also be dependent on the opinions of multiple parties. Furthermore, each party may be assigned to make the choice related to one of the factors. In such situations, it is desirable that choice of each party be recorded and validated, and that the individual choices of the parties all be reflected in the final decision made. For example, in the case of a retailer that needs to purchase products for an upcoming season, the choice of product to buy may originate from the buyer, the choice of supplier may come from upper management, and the total amount the company will pay may come from the accountant. The final decision will be a reflection of the input from each of the three parties.

These multi-tiered decisions are reminiscent of a decision tree where the choices made, with respect to the factor corresponding to a particular level, are not necessarily dependent on other choices at other levels. Each unique path through the tree corresponds to a specific combination of sub-decisions. The distributed ledger (blockchain) of cryptocurrencies such as Bitcoin possesses several characteristics that may be useful for such decision-making. The first of these is that the blockchain provides an immutable record of the actions/data encompassed within transactions. Simultaneously, the transparency of the ledger means that verification and validation of the respective input of various parties in the decisions process is possible.

The Script programming language featured in cryptocurrencies such as Bitcoin gives the opportunity for sophisticated rulesets that determine the conditions upon which the output/token/coins of a Bitcoin transaction are accessed. This smart contract capability can be engaged for the design of a voting system where the successful execution of a contract is dependent on the choices present in a multi-party decision making protocol.

The blockchain constitutes a suitable environment where votes and opinions may be publicly and permanently recorded in order to avoid manipulation of any kind of the votes. Despite this ability, there are numerous issues that are to be addressed in order to create a secure voting on the blockchain. These range from preventing multiple ballots submissions to maintaining the users' privacy and checking of credentials.

As an example, decentralisation is a significant challenge for online e-voting and existing arrangements are usually constructed in such a way as to prevent abuse but rely on a central authority to validate and take into account votes or feedback. The central authority may use different cryptographic primitives, such as blind signatures and homomorphic encryption, in order to add secrecy and verification of eligibility to the ballot vote, for example by participants sending votes to mixing authorities that reshuffle and encrypt the vote before its broadcast, in order to disguise the link between votes and voters.

Decentralised cryptographic methods for vote submission remove the dependency on central trusted authorities. For instance, Secure Multi-Party Computations (MPCs) protocols, whose goal is to enable a set of users to compute a function of their joint private inputs, which they want to keep secret, without the need of a trusted third party, might allow the parties to jointly compute their average vote privately and securely. One known protocol for the efficient computation of an aggregation function has processes which are easily transferable to the specific case of anonymous voting. This involves the use of 'clusters of participants' where these clusters are structured in the topology of a tree or ring. Ballots of users are encrypted with a function that is additively homomorphic and the encrypted values are communicated to all other members of the same cluster. Each user calculates the aggregated value and passes this on to the next cluster if a ring or parent cluster if a tree. The accumulated aggregated value is decrypted at the final or root cluster. Discrepancies in aggregated values along the way are settled by majority decisions. This is supported by a clustering process that is designed that, if adversarial nodes exist and are less than a specific amount, then the majority of nodes in any given cluster are honest nodes.

Protocols have also been proposed to protect the voter's privacy, which is achieved by introducing computationally expensive zero knowledge proof to verify the correctness of a submitted ballot and the honesty of the participant. A mechanism whereby a deposit is required and might be confiscated in case of malicious behaviour has also been implemented.

For these protocols, the emphasis has been on determining the winner through a majority vote.

Thus, it is desirable to provide an arrangement in which a winner is determined by the unique combination of votes obtained from set of voters.

Thus, in accordance with the present invention there is provided a method as defined in the appended claims.

In accordance with the invention there may be provided a method of making a decision on a blockchain, wherein the decision is based on at least one respective selection made by each of a plurality of participants, the method comprising:

receiving, from each of a plurality of participants, a respective plurality of first public keys, wherein each said first public key represents a possible selection by said participant and is related to a corresponding first private key by a cryptographic operation having a homomorphic property;

combining said first public keys, by means of said homomorphic property, to generate a plurality of second public keys, wherein each said second public key represents a possible decision based on a combination of said possible selections;

communicating, to each of said plurality of participants, a plurality of third public keys, wherein each said third public key corresponds to a respective said second public key;

generating a first blockchain transaction, wherein an input of said first blockchain transaction is a script executable by means of a respective digital signature corresponding to a respective said first private key of each of a plurality of said participants, wherein each said first private key represents a said selection made by said participant, and an output of said first blockchain transaction is a script representing a said decision based on said selections made by said participants; and generating a second blockchain transaction for transferring a first digital asset, wherein execution of an output of said second blockchain transaction requires a digital signature corresponding to a said third public key corresponding to said decision of said first blockchain transaction.

This provides the advantage of enabling participants to check that decisions represented by the first blockchain transaction take the selections made by that participant into account, thereby making the decisions more representative of all of the participants. The advantage is also provided of enabling the decision to be verified by means of the third public keys.

An input of the first blockchain transaction may be a script accessible by means of a fourth public key possessed by a supervisor.

This provides the advantage of enabling supervision and/or control of a voting process of the decision.

An output of the first blockchain transaction may be a multi-signature script accessible by means of a digital signature corresponding to a fifth public key possessed by a supervisor.

This provides the advantage of enabling the transaction to be in a form easily propagated on the blockchain.

A plurality of said first private keys may be stored in public key fields of said multi-signature script.

This provides the advantage of enabling data to be stored in the transaction and easily transmitted over the blockchain.

The method may further comprise generating a third blockchain transaction having at least one output corresponding to a respective input to said first blockchain transaction.

Execution of at least one output of said third blockchain transaction may require at least one digital signature corresponding to a respective said first private key.

Execution of at least one output of said third blockchain transaction may require at least one said first private key.

This provides the advantage of more directly connecting a participant to the participant's choice, and enabling a party to sign a transaction independently of knowledge of the choices made by other parties.

At least one output of said third blockchain transaction may be a script applying said cryptographic operation to said first public key.

The method may further comprise receiving said private keys from said participants in encrypted form.

The method may further comprise generating a fourth blockchain transaction for refunding at least part of said first digital asset in the event of non-execution of said second blockchain transaction.

The fourth blockchain transaction may be time locked.

The homomorphic operation may be elliptic curve scalar multiplication.

The invention also provides a system, comprising:
a processor; and
memory including executable instructions that, as a result of execution by the processor, causes the system to perform any embodiment of the computer-implemented method described herein.

The invention also provides a non-transitory computer-readable storage medium having stored thereon executable instructions that, as a result of being executed by a processor of a computer system, cause the computer system to at least perform an embodiment of the computer-implemented method described herein.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which:

FIG. 9 illustrates an output script of the commitment transaction of FIG. 5;

DETAILED DESCRIPTION

Homomorphism for EC Key Pairs

Figure 1:
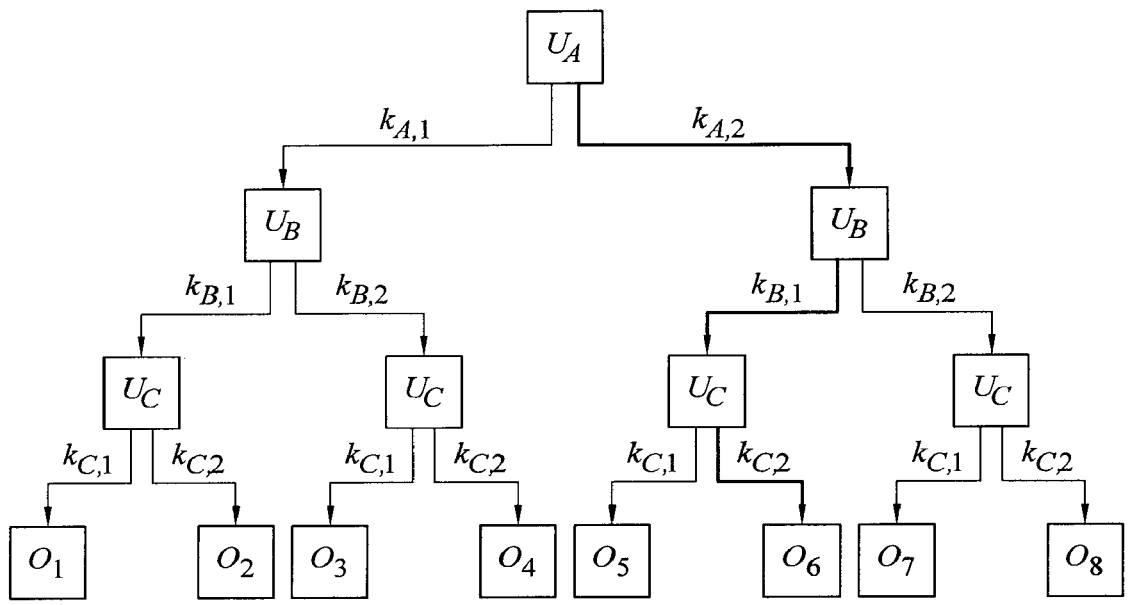
FIG. 1 illustrates a decision tree for use in a method embodying the present invention.

A reason for the utilisation of Elliptic Curve (EC) encryption in this application for obscuring user secret values in the earlier stage of the proposed multi-factor multi-party (MFMP) decision protocol is due to the homomorphic property of EC's private-public key relationship [6].

$$x_1 G + x_2 G = (x_1 + x_2) G$$

x is a private key, G is the base point of the EC and xG the corresponding public key for x.

More generically, where $E(x)=xG$, $$E(m + n) = E(m) + E(n)$$

There exist homomorphic hash functions (and/or encryption functions) for which $$H(m + n) = H(m) + H(n).$$

These homomorphic hash functions too would accomplish some key functionality that the EC cryptography homomorphic private-public key relationship does for the MFMP protocol.

Also, while addition is being utilised in this application the homomorphism property does not have to be for addition, i.e. the contributions of this application can be achieved if the homomorphism property of the hash/encryption function is for other operators. As an example, if the operator is multiplication, consider $$H(mn) = H(m) \times H(n)$$

where H( ) is a hash/encryption function.

More generally, if the operator is a generic operator $\oplus$ such that $$H(m \oplus n) = H(m) \oplus H(n)$$

where H ( ) is a hash/encryption function, then in such a case the operator could be equally applied to the design of the MFMP protocol where homomorphism comes into play.

m-of-n Multisignature Script as Data Storage

Given that Bitcoin transactions do not have fields dedicated to the storage of metadata, the success of the MFMP protocol is dependent on finding a suitable location for recording the choices made by parties for the decision factors to which they have been assigned responsibility.

For the proposed design of the MFMP protocol, the votes are stored using Bitcoin's script for an m-of-n multisignature (multisig) transaction. These multisig elements were initially incorporated into the Bitcoin script so that it requires more than one key to authorise a Bitcoin transaction.

The m-of-n multi-signature script takes the following format:

OP_0 Sig1 Sig2 . . . NumSigs Pub1 Pub2 Pub3 Pub4 . . . NumKeys OP_CHECKMULTSIG where the content NumSigs Pub1 Pub2 Pub3 Pub4 . . . NumKeys OP_CHECKMULTSIG would be of the output script <scriptPubKey> and the content OP_0 Sig1 Sig2 is of the input script <scriptSig>. <scriptPubKey> is the ruleset that allows for a transaction output to be utilised. <scriptSig> is the content required that would satisfy script-PubKey>.

NumSigs is the number of required signatures, NumKeys is the number of possible signatures, and PubX is the public key that corresponds to the signature SigX.

While this script is intended for m-of-n signatures, the PubX elements of the redeem script may be appropriated for use as a store of metadata.

As an example, a 2-of-4 multi-signature script is shown where, of the 4 data elements reserved for Public Keys, two are utilised to store metadata. The script takes the following format:

OP_0 SigA SigB OP_2 meta1 meta2 PubA PubB OP_4 OP_CHECKMULTSIG

These metadata elements could be representative of the set of encrypted votes of parties responsible for deciding on specific factors of the overall decision.

As an example a 1-of-7 multi-signature script is shown where, of the seven data elements reserved for Public Keys, five are utilised to store votes and two for genuine public keys.

The script takes the following format:

OP_0 SigB OP_1 $v_1$ $v_2$ $v_3$ $v_4$ $v_5$ PubA PubB OP_7 OP_CHECKMULTSIG

Elliptic Curve Finite Field Arithmetic and OPCODE

It has been found that if the 200 opcode limit of the Bitcoin Script is removed and that disabled opcodes are re-enabled, the Bitcoin protocol could then carry out Elliptic Curve (EC) Finite Field Arithmetic.

To clarify, an Elliptic Curve is the set of points described by the equation $$y^2 \equiv x^3 + ax + b \pmod{p}$$

where $4a^3 + 27b^2 \not\equiv 0 \pmod{p}$ and p is prime.

For the purposes of the present application, the EC Arithmetic functionality required inside Bitcoin script is that of 'point multiplication by scalar'. This is the operation such that $$nP = \underbrace{P + P + \ldots + P}_{n}$$

where n is a natural number, P is a point on the Elliptic Curve, and + is the operator for addition of points on the EC.

Scalar multiplication in turn requires the specific EC group operations Point Addition and Point Doubling.

Point Addition P+Q: With this operation, we compute a new point on the EC as a negation of the intersection of the curve. This can be described as R=P+Q.

Point Doubling P+P: Using point addition, we can compute a point double of P. This can be described as R=P+P=2P.

More specifically, given two points, $P(x_1,y_1)$ and $Q(x_2, y_2)$, on the EC $$P + Q = (x_3, y_3)$$

where $$x_3 = m^2 - x_1 - x_2 \bmod p$$

$$y_3 = m(x_1 - x_3) - y_1 \bmod p$$

and $$m = \begin{cases} \dfrac{y_2 - y_1}{x_2 - x_1} \bmod p: & \text{if } P \neq Q \text{ (Point Addition)} \\ \dfrac{3x_1^2 + a}{2y_1} \bmod p: & \text{if } P = Q \text{ (Point Doubling)} \end{cases}$$

We employ an EC opcode which provides for the multiplication Q=kG. This opcode is titled OP_ECPMULT. In other words, OP_ECPMULT takes an encoded Elliptic Curve Point and a number and performs Elliptic Curve Multiplication by Scalar. It outputs the result as an encoded Elliptic Curve Point.

Multi-factor Multi-Party Decision Protocol

Overview

The MFMP protocol facilitates a decision-making system that is reminiscent of a decision tree. For the multi-factor multi-party decision tree, each level of the tree (where the root node is level 1) represents a particular 'party-and-factor' whereas each of the branches from each node represents a choice a party makes with respect to a specific factor. FIG. 1 shows a decision tree commensurate with the MFMP protocol of the present application. Each node in the figure represents a 'party-and-factor' and each line/edge between nodes is an option related to a factor. For the decision tree depicted there are n=3 factors (and n parties) and each factor offers m=2 options. For the MFMP protocol m may vary per factor if necessary or applicable.

In general each 'party-and-factor' is represented by a node $U_i$ where i represents the factor the party is deciding on; e.g. $U_A$ represents a party making a decision based on factor A. For each factor a there are set of options, $\{k_{a,j}:\epsilon[0, m_a]\}$, a party may choose from, where $m_a$ is the number of options. The $O_k$ nodes represent the possible decisions or Outcomes resulting from the combination of the choices of the parties. The options selected by the respective parties form a path in the decision tree toward an Outcome $O_x$.

The MFMP protocol caters only to the scenario where the set of options for a factor remains the same regardless of choice made by another party. $\{k_{a,j}\}$ is independent of $\{k_{b,j}\}$. e.g. In FIG. 1, regardless if $k_{A,1}$ or $k_{A,2}$ is chosen via $U_A$, the options available to $U_B$ remain as $k_{B,1}$ and $k_{B,2}$. This leads to decision trees that can only be symmetric.

Figure 2:
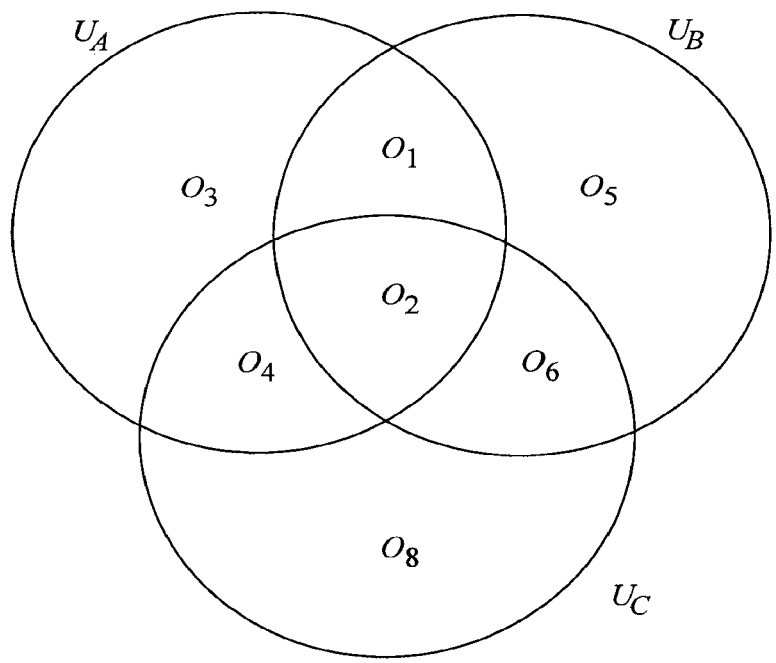
FIG. 2 illustrates the outcome sets of the decision tree of FIG. 1.

As opposed to other voting protocols where the majority of votes determines the winner, for the MFMP protocol it is the unique combination of votes that determines who (what Outcome) wins. A 'vote' by one party is not a vote for a specific Outcome $O_i$ but a vote for 'a set of possible Outcomes'. From FIG. 1, if $U_A$ votes $k_{A,1}$ this represents a choice for the Outcome set $\{O_1,O_2,O_3,O_4\}$ if $U_B$ votes $k_{B,1}$ this represents a choice for the Outcome set $\{O_1,O_2,O_5,O_6\}$ if $U_C$ votes $k_{C,2}$ this represents a choice for the Outcome set $\{O_2,O_4,O_6,O_8\}$ the Outcome of the secret value combination $(k_{A,1},k_{B,1},k_{C,2})$ of the three parties is the intersection of the three sets of Outcomes $O_2$ (See FIG. 2).

Protocol Details

Supervisor

A MFMP protocol is designed to be carried out with the use of a supervising entity termed Supervisor. This Supervisor is expected to be the entity for whom the multi-factor, multi-party decision is being made for and/or the entity given the responsibility of overseeing the execution of the protocol, for example the CEO of a corporation. This Supervisor may also be the one who provides the coins to fund the final outcome of the decision making process. This Supervisor will have the responsibility for transaction construction, signing transaction inputs as appropriate, and creating and submitting transactions in an appropriate order, in a timely fashion, to the blockchain.

The Supervisor will also explain, establish, or negotiate with each voting party, the set of possible choices that may be made with respect to a decision-related factor as well as the corresponding Outcomes.

Initialisation and Keys

All parties agree on the standardised elliptic curve used in Bitcoin, secp256k1, and the set of related parameters including:

G—a base point on the elliptic curve with order q:q×G=0, and q—a large prime number.

For each party assigned to a factor in the decision making process, that party is asked to produce for themselves a set of secret $k_{a,i}$ values where a represents the decision factor and i represents one of the set of options for that decision factor. There are $m_a$ secret $k_{a,i}$ values in this set. The $k_{a,i}$ values are such that $0 < k_{a,i} < q$.

Each party is expected to keep its respective $k_{a,i}$ values secret at this point in the protocol. For each $k_{a,i}$ value, party $U_a$ calculates the corresponding public key value $Q_{a,i} = k_{a,i} G$.

Hierarchy and Summation

Figure 3:
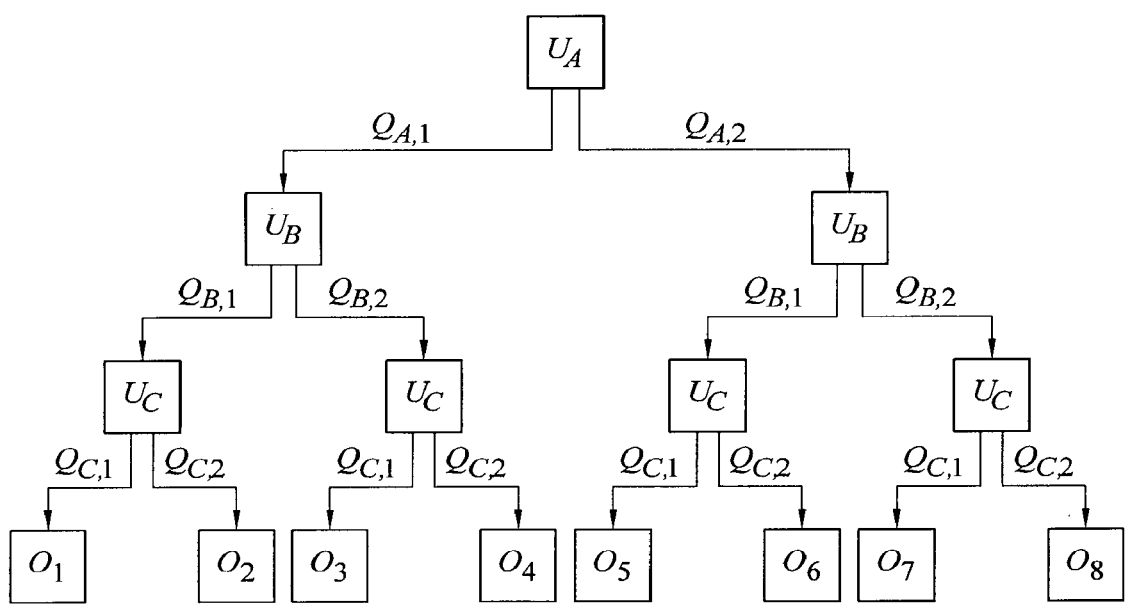
FIG. 3 illustrates possible summations of public keys in a method embodying the present invention.

Each party shares all of its respective public keys, $\{Q_{a,i}\}$, with all the other parties (including the Supervisor). Each party comes to an agreement with the Supervisor on which of their public keys corresponds to which element of the set of choices related to the party's assigned factor. With the public keys from all other parties, a party then calculates (for their individual selves) all possible combinations for summing the public keys, where there are n elements in the summation and each element of the summation is a public key of a different voting party. The summation would correspond to summing the public keys along the possible paths of the decision key hierarchy. (FIG. 3). Also, as discussed above under the heading "Homomorphism for EC Key Pairs", homomorphic functions and/or operators other than addition may be used.

From the example shown in FIG. 3, the possible summations of the public keys (regardless of which party is making the calculations) are $$O_1 = Q_{A,1} + Q_{B,1} + Q_{C,1}$$
$$O_2 = Q_{A,1} + Q_{B,1} + Q_{C,2}$$
$$\ldots$$
$$O_7 = Q_{A,2} + Q_{B,2} + Q_{C,1}$$
$$O_8 = Q_{A,2} + Q_{B,2} + Q_{C,2}$$

Each party is expected to keep a record of how each summation is obtained. By doing this each party will know which of its secret $k_{a,i}$ values (via $Q_{a,i}$) was utilised in obtaining specific $O_i$ Outcome values.

For example the party $U_A$ knows that if for factor A he/she chooses or had chosen '1' (represented by $k_{A,1}$ via $Q_{A,1}$), then the Outcomes which takes into consideration his/her choice $k_{A,1}$, would be $O_1, O_2, O_3$, and $O_4$.

Bear in mind that due to the homomorphic properties of the EC private-public key relationship described above under the heading "Homomorphism for EC Key Pairs", for an Outcome $O_x$ where there are n factors/parties $$O_x = Q_{A,i} + Q_{B,j} + \ldots + Q_{n,k}$$
$$= k_{A,i} G + k_{B,j} G + \ldots k_{n,k} G$$
$$= (k_{A,i} + k_{B,j} + \ldots k_{n,k}) G$$

The summation of the n $k_{a,i}$ values is labelled as $sv_x$, therefore $$sv_x = k_{A,i} + k_{B,j} + \ldots k_{n,k}$$

and as such $$O_x = sv_x G$$

A responsibility of the Supervisor is for communicating to each voting party a new public key/address $S_x$ that is to be directly associated with each $O_x$ outcome of the MFMP instance.

This amounts to the set of pairs $\{(O_x, S_x)\}$ where the set $\{O_x\}$ is bijective with the set $\{S_x\}$. It will be appreciated by persons skilled in the art that in mathematics, a bijection, bijective function or one-to-one correspondence is a function between the elements of two sets, where each element of one set is paired with exactly one element of the other set, and each element of the other set is paired with exactly one element of the first set, such that there are no unpaired elements". The public key $S_x$ does not necessarily belong to the Supervisor himself, but may be owned by a separate individual who is tasked with carrying out the duties with respect to the Outcome $O_x$. For a person to 'own' a public key or for a public key to 'belong to' a person, in this context means that the person has knowledge of the private key which corresponds to the public key.

Each party knowing its set of possible Outcomes if it votes a certain way with respect to a specific factor, will inspect the commitment transaction to ensure that the options related to the $O_x$ value in the Escrow script are paired with the correct $S_x$ public key—such that both public keys require signatures in order for escrowed funds or tokens to be accessed. Essentially, a party may choose not to provide its vote if one of the possible outcomes $O_x$ of the decision making process is not tied to the correct $S_x$ (in accordance with the earlier agreement with the Supervisor) in the commitment transaction's escrowed output.

Embodiment 1—Transactions and Choice Documentation

The MFMP protocol is built upon 4 core transactions; a commitment transaction $T_C$, a payment transaction $T_P$, a refund transaction $T_R$, and a voting transaction $T_V$. The interfacing of these 4 transactions is represented in FIG. 4.

Figure 4:
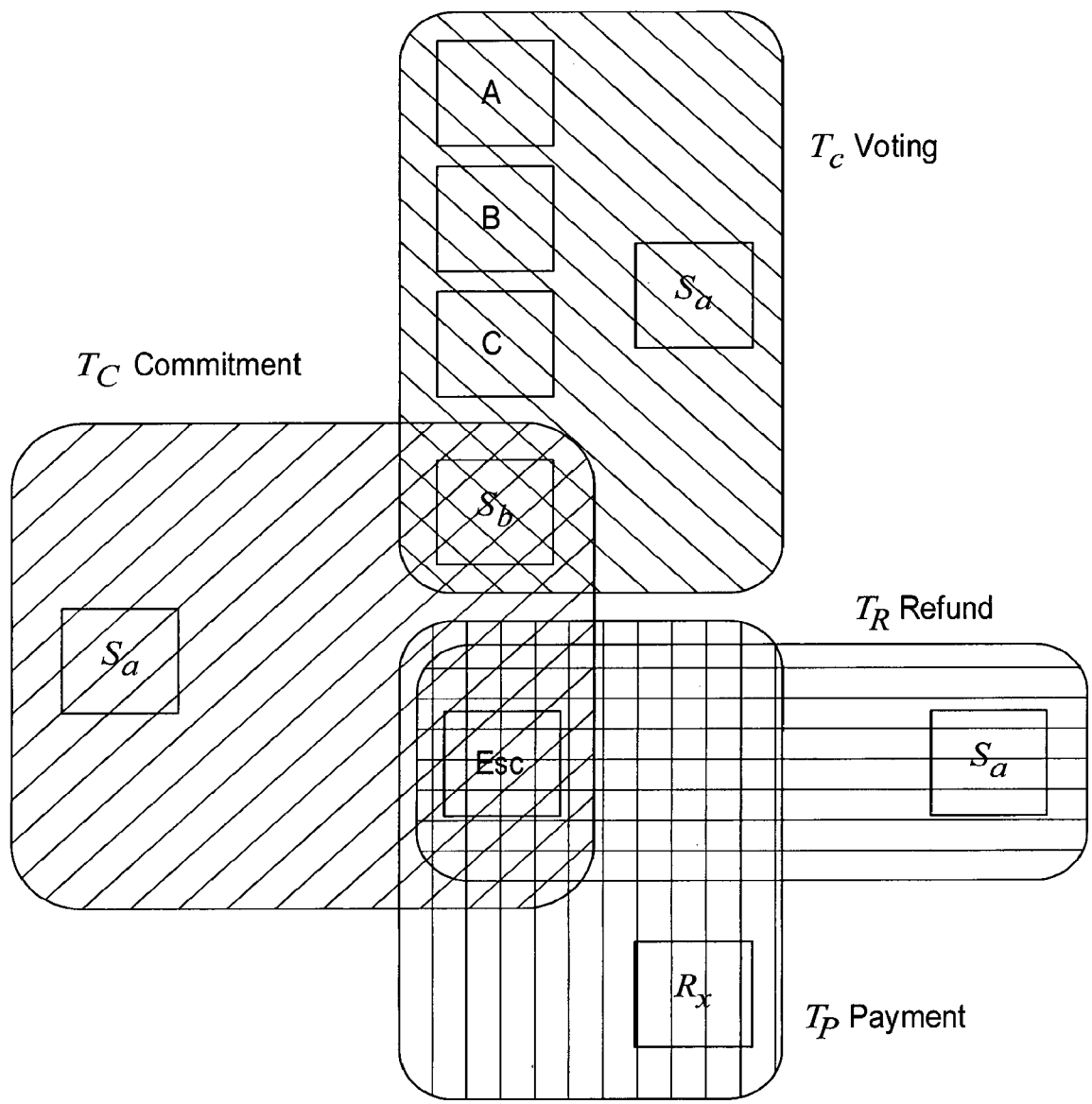
FIG. 4 illustrates blockchain transactions from a method embodying the present invention.

In FIG. 4, each transaction is represented by a rectangle with rounded corners. Inputs and outputs of a transaction are represented by basic rectangles. Inputs are shown on the left half of a transaction whereas outputs are shown on the right half of a transaction. The labels of the input and output rectangles are of the public keys of the 'source of coins' and the 'intended recipient' respectively; e.g. $S_a$ is a source of funds for the voting transaction while at the same time being a recipient of funds of the commitment transaction. In the present case, the public key of a person may be used as the label of the person himself. Esc output/input is the exception in that the output-input is not directed at one specific address/public key, but can be accessed by different keys based on the ability to satisfy stated criteria.

Commitment Transaction

The commitment transaction $T_C$ (See FIGS. 4 and 5) is the main transaction of the MFMP protocol and includes as its input(s) the coins Fu to fund the one outcome that is representative of the choices of all voting parties. These funds are assumed to be from an entity/individual titled the Supervisor S. As an example this Supervisor could be the CEO or accountant/treasurer of the company who is responsible for the finances of the company. The address from which the Supervisor provides these funds is labelled $S_a$.

The commitment transaction is expected to have at least two outputs. The first of these is of a nominal fee that is being transferred to a second address belonging to the Supervisor. This output address is utilised as an easy means for stakeholders to link the commitment transaction to the voting transaction utilising information stored in the blockchain. The address of these funds is of a second address $S_b$ owned by the Supervisor.

The second output of the commitment transaction is that of escrowing a quantity of coins—in that the 'winning' Outcome of the decision tree will be received (or be funded from) these escrowed coins. This output is described as being 'escrowed' as the funds are not immediately exclusive to a specific output address/public key but has conditions attached to the bitcoin script of this output that allows for these funds to be transferred to one of a set of possible addresses—where the eventual address to which the coins are granted is dependent on script-stipulated criteria being satisfied.

This script is such that the set of conditions only gives access to the escrowed coins if the requisite $k_{a,i}$ values of the participating parties are available. More specifically, the criteria in the script for the selection of an output address for the escrowed funds are that signatures be produced for the public keys $O_x$ and $S_x$, where $$O_x = sv_x G,$$
$$sv_x = k_{A,i} + k_{B,j} + \ldots k_{n,k}$$

and $S_x$ is the unique output address paired with the Outcome $O_x$.

Voting Transaction

Figure 6:
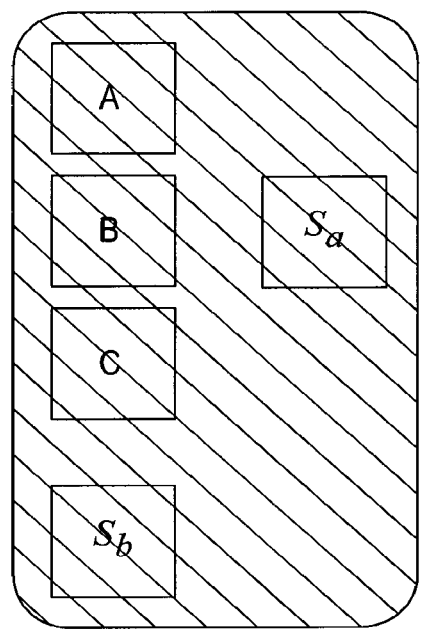
FIG. 6 illustrates the voting transaction of FIG. 4.

The voting transaction $T_V$ (See FIGS. 4 and 6) is responsible for the recording of the choices the parties have made with respect to their assigned decision factors.

This voting transaction is 'linked' to the commitment transaction by using the $S_b$ output of the commitment transaction as an input of the voting transaction where $S_b$ is a second address controlled by the Supervisor. This link serves three purposes:

Linking $T_C$ and $T_V$—Having the shared address between both (voting and commitment) transactions allows stakeholders to easily retrieve the other transaction if they have found one of the aforementioned two transactions in the blockchain. Note that the commitment transaction is placed on the blockchain before the voting transaction, therefore while a commitment transaction may exist on the blockchain without a voting transaction also being present, it does not work the other way around.

Recording of Association—This link provides a documented association between the commitment transaction and its escrowed funds and the votes being cast by the parties.

Supervisor Approval—An address of the Supervisor being included as input in the voting transaction gives the Supervisor an element of supervision over the votes being cast—as the Supervisor signing the input $S_b$ (of the voting transaction) acts as a formal representation of the Supervisor's acceptance of the votes of the parties.

The voting transaction itself is expected to be constructed by the Supervisor and then passed along to the parties so that each part may add their vote to the transaction. The votes are the $k_{a,i}$ values. The fields reserved for public keys in an m-of-n multisig script are used to store the votes within voting transaction. This script is used as the output script, <scriptPubKey>, of the voting transaction. It will be familiar to persons skilled in the art that <scriptPubKey> is, for Bitcoin, the ruleset that allows for a transaction output to be utilised. <scriptSig> is the content required that would satisfy <scriptPubKey>.

The current version of the voting transaction which includes the m-of-n script containing the $k_{a,i}$ values, is now returned to the Supervisor. The Supervisor in possession of the set of n $k_{a,i}$ values provided by the parties would validate the votes by determining if $$(k_{A,i} + k_{B,j} + \ldots k_{n,k})G$$

is equal to one of the $O_x$ Outcomes from the calculated hierarchy.

If vote combination is validated, the Supervisor then adds to the m-of-n multisig script of voting transaction's output script, <scriptPubKey>, the public key $S_a$. This is the main public key ('address') of the Supervisor and the Supervisor is expected to produce a signature for $S_a$ for the <scriptSig> of any transaction who desires to spend any of the coins at the output of the voting transaction.

An example of the voting transaction's output script combined with the input script of a transaction that spends this output is shown below:

OP_0 Sig $S_a$ OP_1 $k_{A,i}$ $k_{B,j}$ $k_{C,k}$ Pub $S_a$ OP_4 OP_CHECKMULTSIG

This 1-of-4 multisig of the <scriptPubKey> includes the 3 votes cast by the parties responsible for factors A, B, and C; it also includes the public key $S_a$.

The current version of the voting transaction is then resent to each party, who on confirming the inclusion of his/her vote in the final version of the output script, signs his/her input to the transaction, representing their approval of the voting transaction, i.e. they acknowledge that their vote has been included in the voting transaction. The Supervisor signs his input to the voting transaction then the voting transaction is submitted to the blockchain.

Alternatively, each party may communicate in a secure way their vote to the Supervisor, who then adds all the votes to the output script of the voting transaction, and then sends this transaction to the various parties for their respective input signatures.

It should be noted that:
  the funds/coins that each party utilises/contributes for their input to the voting transaction is a minimum or nominal fee. The voting transaction is meant more as an immutable record of votes more so than a transfer of funds.
  for the current version of the Bitcoin protocol, the maximum number of public keys allowable in a multisig output is 15. For this reason, the maximum number of votes (voters) that the described m-of-n multisig script may allow is 14 (bearing in mind that one of the fifteen spaces is reserved for a public key $S_a$ of the Supervisor). More elaborate scripts including multiple redundant m-of-n multisig (sub)scripts may be constructed to incorporate more votes, keeping in mind however, that the maximum size of the script is 10 kilobytes [7] and that transaction costs are dependent on the size of the transaction.

where applicable, the Supervisor may also have a vote based on a decision-related factor.

Payment Transaction

Figure 5:
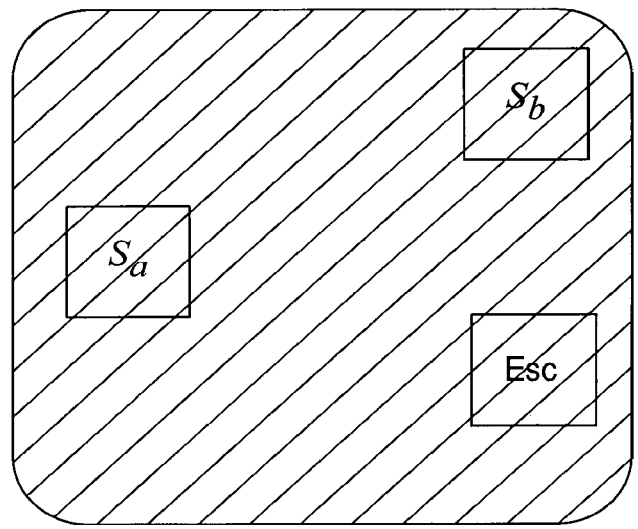
FIG. 5 illustrates the commitment transaction of FIG. 4.
Figure 7:
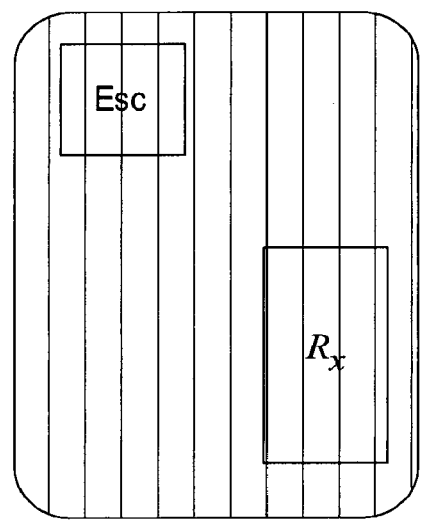
FIG. 7 illustrates the payment transaction of FIG. 4.

The payment transaction $T_P$ (See FIGS. 4 and 7) is the transaction that may successfully access the escrowed coins at the Esc output of the commitment transaction (See FIGS. 4 and 5). This transaction will include two signatures in its input script, <scriptSig>, the first being the signature for the public key $O_x$ where $$(k_{A,i} + k_{B,j} + \ldots k_{n,k})G = O_x$$

and each $k_{a,i}$ is for a different decision-related factor.

The unique combination of $k_{a,i}$ values present in the script is the determinant of who (owner of a public-private key pair) is able to access the Esc coins. These $k_{a,i}$ values would have been retrieved from the voting transaction available on the blockchain.

The second signature in the payment transaction's input script is that for the public key $S_x$, which is a public key of the individual who has been assigned responsibility for supervising $O_x$. This is not necessarily the main Supervisor of the protocol (owner of $S_a$ and $S_b$) but could be any another approved individual. In addition, where applicable, especially for security/control purposes, a third signature could be mandated for the input script of the payment transaction, where this third signature is that of the main Supervisor.

If the input of the payment transaction is successfully signed then escrowed coins of the commitment transaction can be moved to a recipient address, $R_x$, related to the Outcome $O_x$. The payment transaction is submitted to the blockchain after the voting transaction.

Refund Transaction

Figure 8:
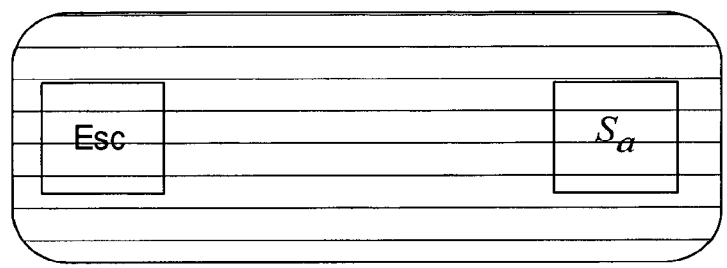
FIG. 8 illustrates the refund transaction of FIG. 4.

The refund transaction (FIGS. 4 and 8) is a transaction that returns escrowed funds to all parties (Supervisor or otherwise) who would be contributing funds to the commitment transaction. It is seen as fail-safe measure if the participants of the protocol have not acted as they should. Importantly this refund transaction includes an nTimeLock value which prevents it from being accepted by the blockchain until after a certain point in time (unix time or block height) has passed.

The input script of the refund transaction includes data that would satisfy one of the options available in the escrowed output script of the commitment transaction. This data may be the signatures of the main Supervisor (who committed the escrowed funds) and other stakeholders. All other stakeholders must sign the refund transaction before the commitment transaction is submitted to the blockchain by the Supervisor. This ensures that the Supervisor is able to retrieve all committed escrowed-funds if things go wrong.

The refund transaction is an optional transaction and can only be submitted to the blockchain if no payment transaction of the MFMP protocol instance has been submitted. Moreover the refund transaction can only be submitted after a certain point in time. With this in mind the nTimeLock value of the refund transaction must be chosen so that after the commitment transaction is submitted at time T, enough time is given for votes to be obtained,
the voting transaction committed to the blockchain,
voting transaction found in blockchain,
and the payment transaction created and submitted to blockchain.

The assigned time (span) to accomplish all this is labelled as s. The nTimeLock value for the refund transaction would thus at least be $$nTimeLock = T + s$$

Note that time the nTimeLock value can either be defined in seconds or block height.

Escrow-Related Scripts

Output Script: Commitment Transaction Escrow

The escrowed funds of the commitment transaction are expected to be 'protected' by a stack-based script language that allows for a set of possible ways for the escrowed funds to be accessed/claimed/used. Each of these ways of accessing escrowed funds has an associated set of criteria that must be satisfied in order for the funds to be retrieved. The escrow script can essentially be seen as representative of a set of case statements where each option in the case statements is a different way of accessing escrowed funds. Assuming that there are t options, for t−1 of these options (one criteria is related to refund signature(s)) the criteria for each case are to be (at least):

An ECDSA signature is to be produced for the public address of $$(k_{A,i} + k_{B,j} + \ldots k_{n,k})G = O_x$$

AND

An ECDSA signature is to be produced for the public key, $S_x$, of someone in a supervisory role for $O_x$.

FIG. 9 illustrates a high level version of a Bitcoin output script that represents the escrow case statements (featuring 8 options). (cond_i) represents the criteria/condition that needs to be satisfied and [Do_i] represents the action to perform if (cond_i) evaluates as true.

Being more specific as it relates to the output script, the condition (cond_i) that may be used to represent the need for two ECSDA signatures could be that of a 2-of-2 multisig (sub)script such as:

OP_2 Pub $O_x$ Pub $S_x$ OP_2 OP_CHECKMULTSIG
where Pub $O_x$=$(k_{A,i}+k_{B,j}+ \ldots k_{n,k})G$ and Pub $S_x$ is the public key of entity assigned to Outcome $O_x$.

The action that each [Do_i] element of the script is to be asked to perform, assuming (cond_i) evaluates as true, is to deposit the value 1/TRUE on the top of the stack. It will be appreciated by persons skilled in the art that Bitcoin script is a stack-based language and that a value of 'TRUE' at the top of the stack after completion of script execution means that the script has executed successfully.

Input Script: Payment Transaction

To successfully access the coins of the escrowed output of the commitment transaction, this requires that when the output script, <scriptPubKey>, of the escrowed output is combined with the input script, <scriptSig>, of the payment transaction, that the combined script successfully executes. i.e. produces an 1/TRUE, at the top of the stack.

At least one data element <data_i> must be included in the input script that would result in at least one of the if-statements of the output script to be true, ultimately leading to the combined input and output scripts to evaluate to true.

It should be noted that <data_i> may represent multiple fields of data. As an example <data_i> may be a combination of three values, <op_0><sigO$_x$><sigS$_c$>, for a 2-of-2 multisig script.

It should also be noted that, depending on the option being considered, some redundant data, <bd_datai>, may also be included in the input script where applicable. <bd_dti>, 'bad data', is meant to represent data that when processed by (cond_i) is guaranteed to produce 0/FALSE as the output. Similar to that of <data_i>, <bd_dti> may be comprised of multiple individual data elements. In fact <bd_dti> is expected to be composed of the same number of data elements as <data_i>.

MFMP Flowchart

Figure 10:
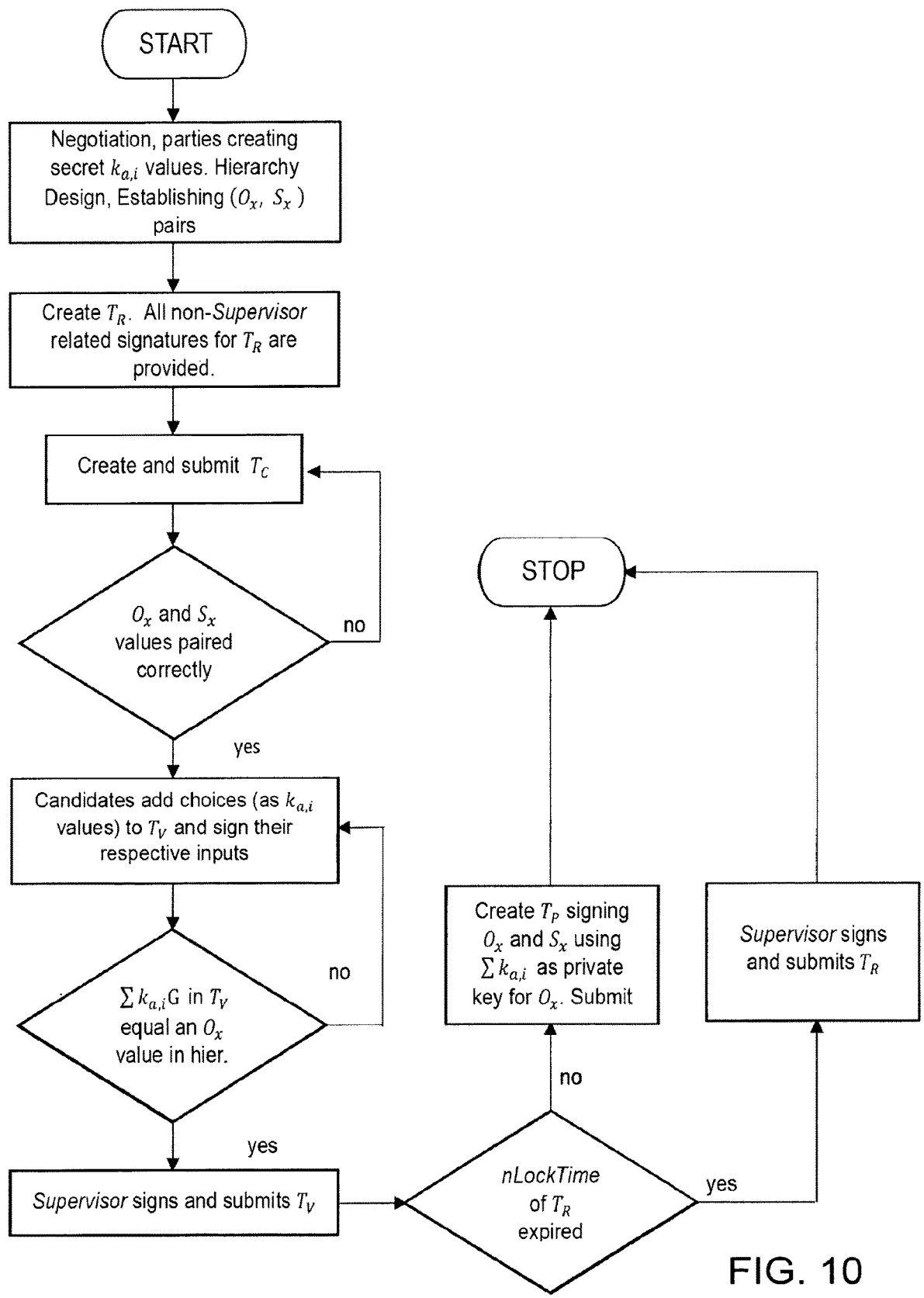
FIG. 10 illustrates a flowchart of a method embodying the present invention.

FIG. 10 shows a general overview of the Multi-Factor Multi-Party voting protocol.

Figure 11:
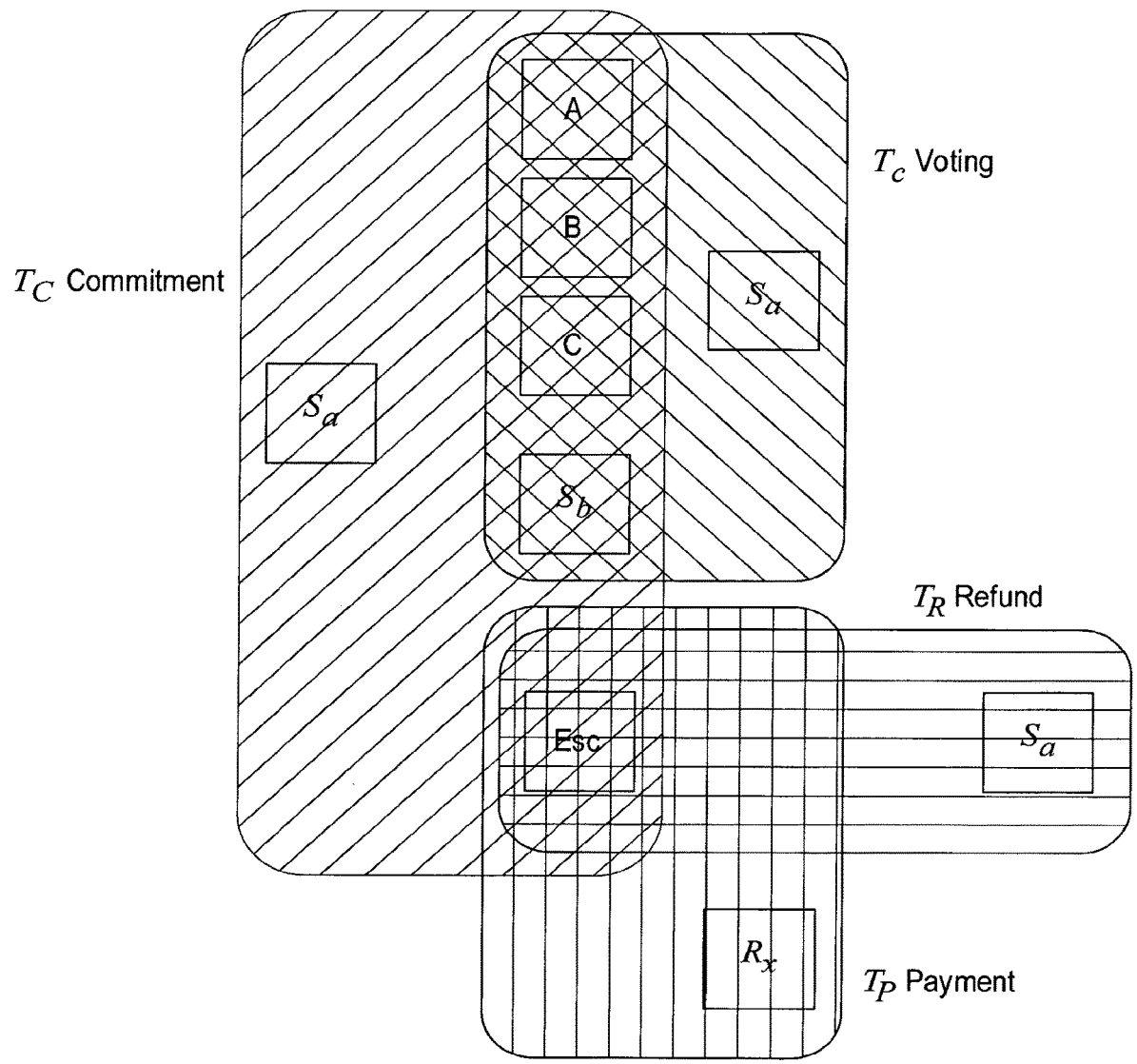
FIG. 11 illustrates blockchain transactions of a further embodiment of the invention.
Figure 12:
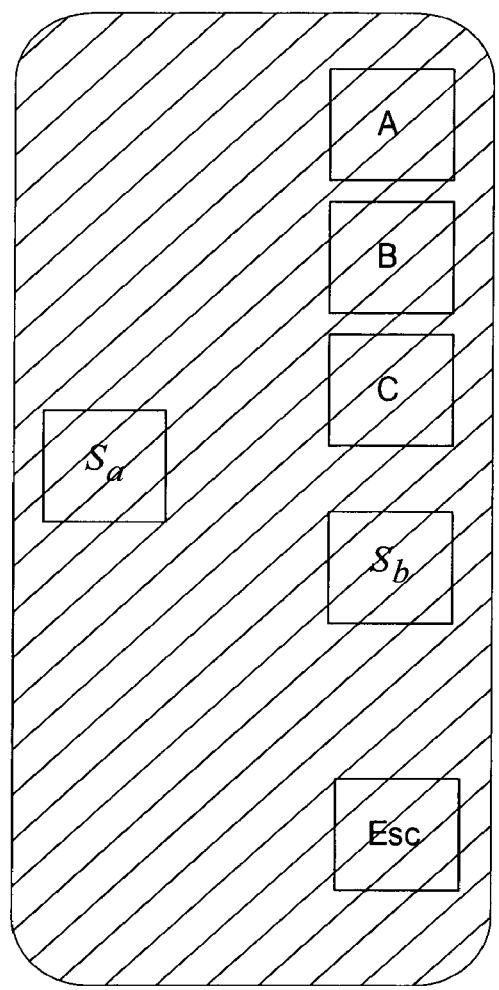
FIG. 12 illustrates the commitment transaction of FIG. 11.
Figure 13:
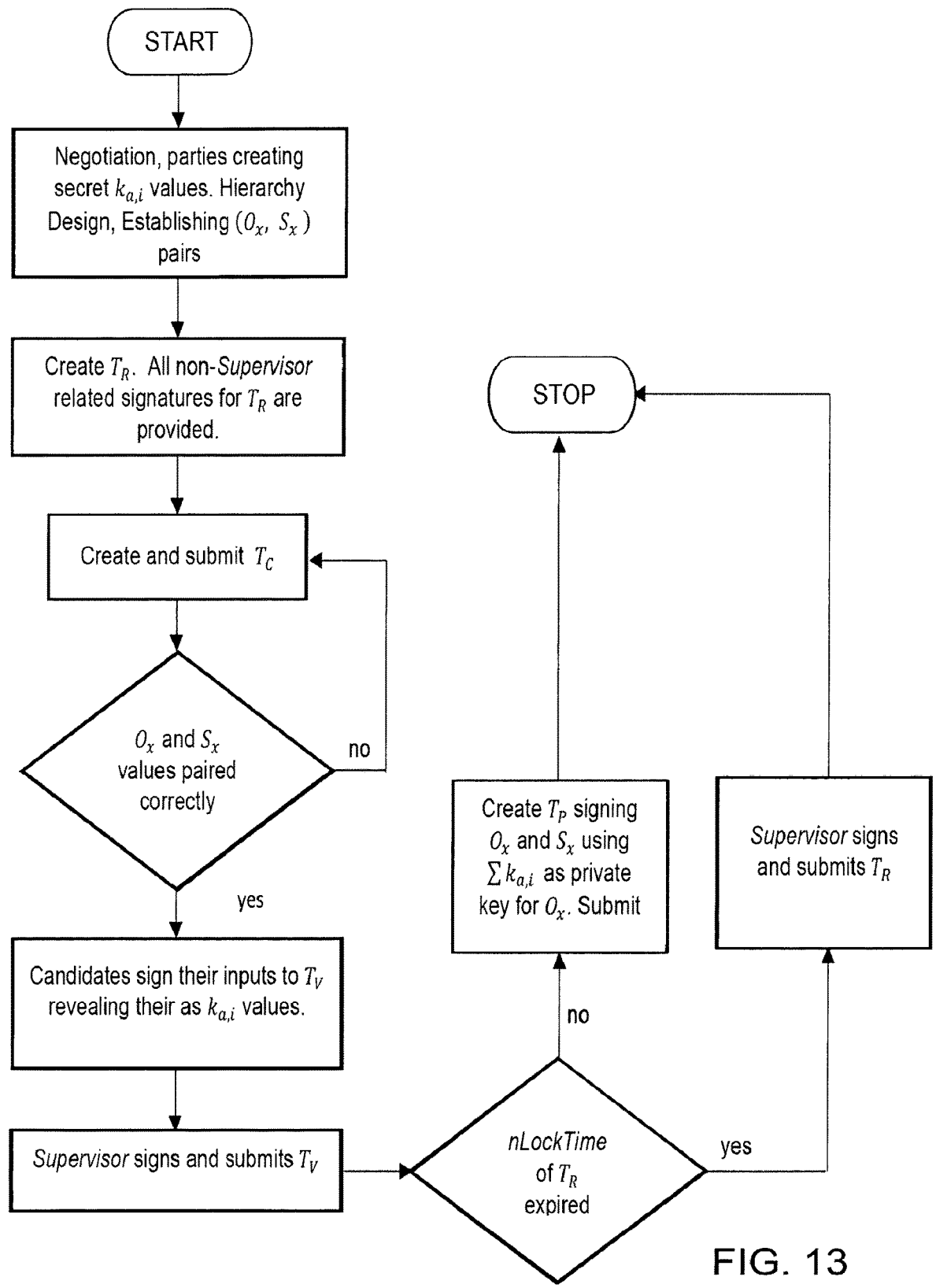
FIG. 13 illustrates a flowchart of a further embodiment of the invention.

An arrangement of a further embodiment of the invention is shown in FIGS. 11 to 13.

Embodiment 2—Transactions and Choice Documentation

The present embodiment differs from the multi-factor multi-party protocol of the first embodiment in that whereas the first embodiment records the votes of the parties as a combined set of votes included in the m-of-n multisig output script of the voting transaction, the present embodiment asks the voting parties to reveal their votes by including their votes as an argument of the input script of the voting transaction. By doing this, this provides the advantages of more directly connecting a party to their vote, and allowing a party to sign a transaction independently of the knowledge of the votes of the other parties.

In the first embodiment, the votes of the various parties are stored in an m-of-n multisig output script of the voting transaction. To indicate confirmation that their vote is represented and/or documented in the voting transaction, each party (e.g. parties A, B, and C of FIG. 11) will sign their corresponding input of the voting transaction. While this signature can be seen as such a confirmation, it is not documented within the blockchain which vote belongs to which participant. This information may be useful in some scenarios. At the same time, a party cannot sign the voting transaction until all parties have contributed their vote to the m-of-n multisig output script.

The second embodiment introduces a variation of the multi-factor multi-party decision making protocol of the first embodiment that addresses the restrictions described on a party's storage and confirmation of votes in the voting transaction of such a protocol. It does this by making it mandatory for parties to reveal their votes in order to access the funds used as input for the voting transaction.

In order to achieve this, it is assumed that there exists an opcode in the Bitcoin script that allows for Elliptic Curve (EC) 'point multiplication by scalar'. This in turn requires that the 200 opcode limit of Bitcoin Script be removed and that disabled opcodes are re-enabled. A description of the technologies utilised in the present embodiment, including the homomorphic properties of the private-public key relationship in Elliptic Curve (EC) cryptography, as well as the proposed opcode, is provided in detail above.

The proposed protocol of the present embodiment differs from the MFMP protocol of the first embodiment in the element of (voting) transaction where votes are stored and, subsequently, 'how and when' one can go about signing as confirmation that one's vote is represented.

Commitment Transaction

As is the case with the first embodiment, the second embodiment is built upon 4 core transactions; a commitment transaction $T_C$, a payment transaction $T_P$, a refund transaction $T_R$, and a voting transaction $T_V$. The interfacing of these 4 transactions is represented in FIG. 11.

Commitment Transaction

The commitment transaction of the present embodiment differs from that of the first embodiment in that the commitment transaction of the present embodiment is expected to have at least four outputs, as shown in FIGS. 11 and 12. The first output is of a nominal fee that is being transferred to a second address, $S_b$, belonging to the Supervisor. This output address is utilised as an easy means of stakeholders to link the commitment transaction to the voting transaction utilising information stored in the blockchain. More importantly it serves as a way of giving the Supervisor jurisdiction over the voting transaction as these outputs are also inputs to the voting transaction, inputs that will require signatures.

The second output of the commitment transaction, as is the case with the first embodiment, is that of escrowing a quantity of coins—in that the 'winning' Outcome of the decision tree will be received (or be funded from) these escrowed coins.

The second embodiment further differs from the first embodiment in that the other outputs (of which there will be at least 2) are to public addresses belonging to the voting parties; e.g. parties A, B, and C of FIGS. 11 and 12. These outputs are to be designed so that to access the funds the parties are required to produce their respective votes (as well as a signature for public key A). As an example, if party A was to spend the A output of the commitment transaction, he/she would have to include the vote $k_{A,i}$ for the public key $Q_{A,i}=k_{A,i}G$ in the input script of the voting transaction, thus revealing, on the blockchain, their vote $k_{A,i}$.

Given that a party may vote several ways as it relates to their assigned factor, the output script <scriptPubKey> of the commitment transaction for a voting party (e.g. party A) must include several options for accessing funds, each based on one of the options for the voting party. Using the structure of the multi-option (nested if-else) high level script described with reference to FIG. 9, the Bitcoin script of the condition, (cond_i), that allows for the payment of funds from option i is <basepoint G> OP_ECPMULT <$Q_{A,i}$> OP_EQUAL-VERIFY <pub A> OP_CHECKSIG It can be seen that this script utilises the proposed opcode OP_ECPMULT discussed above under the heading "Elliptic Curve Finite Field Arithmetic and OPCODE".

For (cond_i) to be satisfied, the voting party A needs to include the <datai> element «sig A><$k_{A,i}$»

Where sig A is the signature of public key A and $k_{A,i}$ is party A's vote.

It should be noted that the party A's vote is revealed in <datai> as part of the process of accessing party A's output of the commitment transaction.

Voting Transaction

The voting transaction of the second embodiment (see FIG. 11) is 'linked' to the commitment transaction through the $S_b$ output as well as the voting-party outputs of the commitment transaction. These outputs of the commitment transaction are inputs to the voting transaction.

The voting transaction itself is expected to be constructed by the Supervisor and then passed along to the parties so that each part may sign their respective inputs. It should be recalled (from the commitment transaction described above) that a party signing their input to the voting transaction requires that the party's vote, $k_{a,i}$, be revealed.

The Supervisor signs his input to the voting transaction then the voting transaction is submitted to the blockchain.

It should be noted that the coins that each party utilises/contributes for their input to the voting transaction is a minimum or nominal fee. The voting transaction is meant more as an immutable record of votes than a transfer of funds.

FIG. 13 shows a general overview of the Multi-Factor Multi-Party voting protocol.

Figure 14:
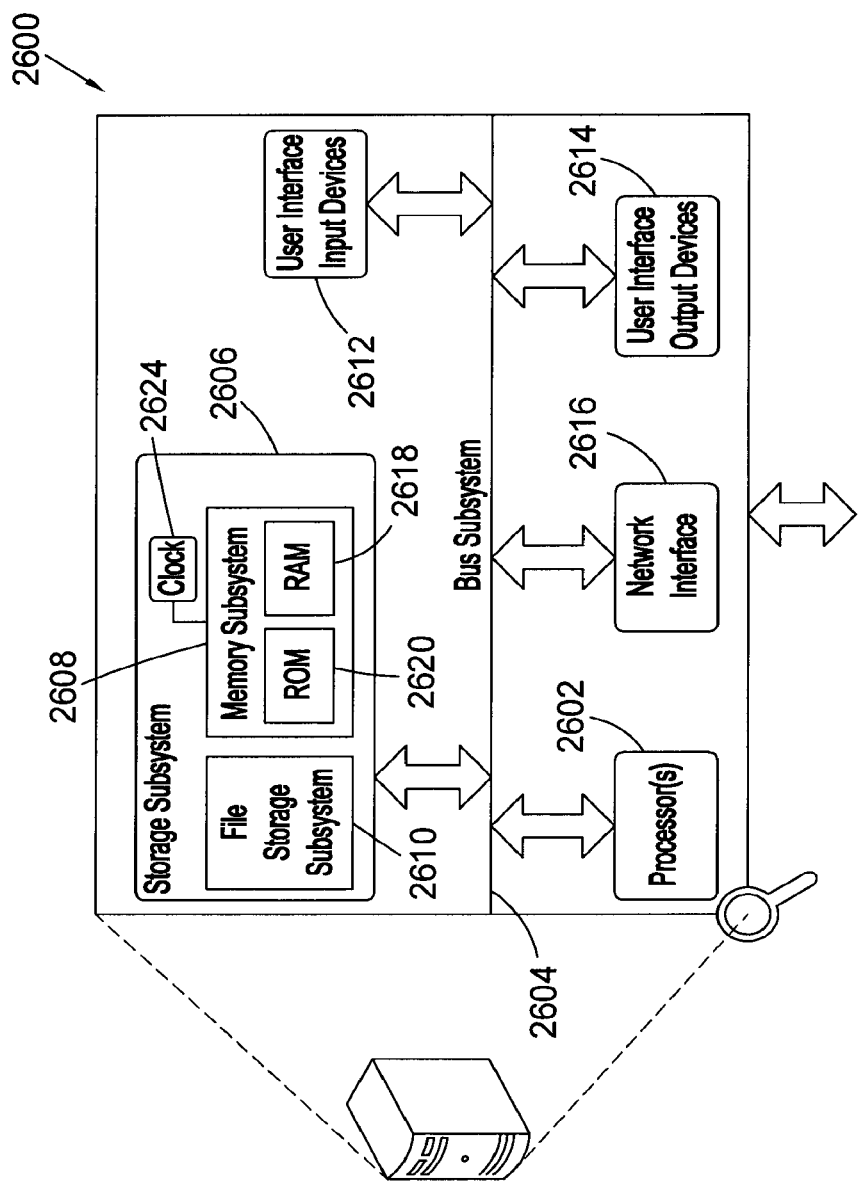
FIG. 14 is a schematic diagram illustrating a computing environment in which various embodiments can be implemented.

Turning now to FIG. 14, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 14, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 14 is intended only as a specific example for purposes of illustrating the preferred embodiment of the device. Many other configurations having more or fewer components than the system depicted in FIG. 14 are possible.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

REFERENCES

| Reference | Author, date, name & location |
|---|---|
| 1- | Riemann, R., & Grumbach, S. (2017). Distributed Protocols at the Rescue for Trustworthy Online Voting. *arXiv preprint arXiv:1705.04480*. |
| 2- | Chaum, D. L. (1981). Untraceable electronic mail, return addresses, and digital pseudonyms. *Communications of the ACM, 24*(2), 84-90. |
| 3- | Yao, A. C. (1982, November). Protocols for secure computations. In *Foundations of Computer Science, 1982. SFCS'08. 23rd Annual Symposium on* (pp. 160-164). |
| 4- | Gambs, S., Guerraoui, R., Harkous, H., Huc, F., & Kermarrec, A. M. (2011). Scalable and secure aggregation in distributed networks. *arXiv preprint arXiv:1107.5419*. |
| 5- | Zhao, Z., & Chan, T. H. H. (2015, December). How to vote privately using bitcoin. In *International Conference on Information and Communications Security* (pp. 82-96). Springer International Publishing. |
| 6- | Maxwell, G. (2015) Confidential Transactions https://people.xiph.org/~greg/confidential_values.txt |
| 7- | Bitcoin Script Interpreter https://github.com/bitcoin/bitcoin/blob/fcf646c9b08e7f846d6c99314f937ace50809d7a/src/script/interpreter.cpp#L256 |

What is claimed is:

1. A method of making a decision on a blockchain, wherein the decision is based on at least one respective selection made by each of a plurality of participants, the method comprising:
   receiving, from each of said plurality of participants, a respective plurality of first public keys, wherein each said first public key represents a possible selection by said participant and is related to a corresponding first private key by a cryptographic operation having a homomorphic property;
   combining said first public keys, by means of said homomorphic property, to generate a plurality of second public keys, wherein each said second public key represents a possible decision based on a combination of said possible selections;
   communicating, to each of said plurality of participants, a plurality of third public keys, wherein each said third public key corresponds to a respective said second public key;
   generating a first blockchain transaction, wherein an input of said first blockchain transaction is a script executable by means of a respective digital signature corresponding to a respective said first private key of each of a plurality of said participants, wherein each said first private key represents a said selection made by said participant, and an output of said first blockchain transaction is a script representing said decision based on said selections made by said participants;
   generating a second blockchain transaction for transferring a first digital asset, wherein execution of an output of said second blockchain transaction requires a digital signature corresponding to said third public key corresponding to said decision of said first blockchain transaction; and
   generating a third blockchain transaction having at least one output corresponding to a respective input to said first blockchain transaction.

2. The method according to claim 1, wherein an input of the first blockchain transaction is a script accessible by means of a fourth public key possessed by a supervisor.

3. The method according to claim 1, wherein execution of at least one output of said third blockchain transaction requires at least one digital signature corresponding to a respective said first private key.

4. The method according to claim 1, wherein execution of at least one output of said third blockchain transaction requires at least one said first private key.

5. The method according to claim 4, wherein at least one output of said third blockchain transaction is a script applying said cryptographic operation to said first public key.

6. The method according to claim 1, further comprising receiving said first private keys from said participants in encrypted form.

7. The method according to claim 1, further comprising generating a fourth blockchain transaction for refunding at least part of said first digital asset in the event of non-execution of said second blockchain transaction.

8. The method according to claim 7, wherein the fourth blockchain transaction is time locked.

9. The method according to claim 1, wherein the cryptographic operation is elliptic curve scalar multiplication.

10. A computer-implemented system comprising:
   a processor; and
   memory including executable instructions that, as a result of execution by the processor, cause the system to carry out a method of making a decision on a blockchain, wherein the decision is based on at least one respective selection made by each of a plurality of participants, the method comprising:

receiving, from each of a plurality of participants, a respective plurality of first public keys, wherein each said first public key represents a possible selection by said participant and is related to a corresponding first private key by a cryptographic operation having a homomorphic property;

combining said first public keys, by means of said homomorphic property, to generate a plurality of second public keys, wherein each said second public key represents a possible decision based on a combination of said possible selections;

communicating, to each of said plurality of participants, a plurality of third public keys, wherein each said third public key corresponds to a respective said second public key;

generating a first blockchain transaction, wherein an input of said first blockchain transaction is a script executable by means of a respective digital signature corresponding to a respective said first private key of each of a plurality of said participants, wherein each said first private key represents a said selection made by said participant, and an output of said first blockchain transaction is a script representing said decision based on said selections made by said participants;

generating a second blockchain transaction for transferring a first digital asset, wherein execution of an output of said second blockchain transaction requires a digital signature corresponding to said third public key corresponding to said decision of said first blockchain transaction; and generating a third blockchain transaction having at least one output corresponding to a respective input to said first blockchain transaction.

11. The computer-implemented system according to claim 10, wherein execution of at least one output of said third blockchain transaction requires at least one digital signature corresponding to a respective said first private key.

12. The computer-implemented system according to claim 10, wherein execution of at least one output of said third blockchain transaction requires at least one said first private key.

13. The computer-implemented system according to claim 12, wherein at least one output of said third blockchain transaction is a script applying said cryptographic operation to said first public key.

14. The computer-implemented system according to claim 10, wherein the method further comprises receiving said first private keys from said participants in encrypted form.

15. The computer-implemented system according to claim 10, wherein the method further comprises generating a fourth blockchain transaction for refunding at least part of said first digital asset in the event of non-execution of said second blockchain transaction.

16. A non-transitory computer-readable storage medium having stored thereon executable instructions that, as a result of being executed by a processor of a computer system, cause the computer system to carry out a method of making a decision on a blockchain, wherein the decision is based on at least one respective selection made by each of a plurality of participants, the method comprising:

receiving, from each of a plurality of participants, a respective plurality of first public keys, wherein each said first public key represents a possible selection by said participant and is related to a corresponding first private key by a cryptographic operation having a homomorphic property;

combining said first public keys, by means of said homomorphic property, to generate a plurality of second public keys, wherein each said second public key represents a possible decision based on a combination of said possible selections;

communicating, to each of said plurality of participants, a plurality of third public keys, wherein each said third public key corresponds to a respective said second public key;

generating a first blockchain transaction, wherein an input of said first blockchain transaction is a script executable by means of a respective digital signature corresponding to a respective said first private key of each of a plurality of said participants, wherein each said first private key represents a said selection made by said participant, and an output of said first blockchain transaction is a script representing a said decision based on said selections made by said participants;

generating a second blockchain transaction for transferring a first digital asset, wherein execution of an output of said second blockchain transaction requires a digital signature corresponding to said third public key corresponding to said decision of said first blockchain transaction; and generating a third blockchain transaction having at least one output corresponding to a respective input to said first blockchain transaction.

17. The non-transitory computer-readable storage medium according to claim 16, wherein execution of at least one output of said third blockchain transaction requires at least one digital signature corresponding to a respective said first private key.

18. The non-transitory computer-readable storage medium according to claim 16, wherein execution of at least one output of said third blockchain transaction requires at least one said first private key.

19. The non-transitory computer-readable storage medium according to claim 16, wherein at least one output of said third blockchain transaction is a script applying said cryptographic operation to said first public key.

20. The non-transitory computer-readable storage medium according to claim 16, wherein the method further comprises generating a fourth blockchain transaction for refunding at least part of said first digital asset in the event of non-execution of said second blockchain transaction.

* * * * *